United States Patent [19]
Cousin et al.

[11] 3,961,324
[45] June 1, 1976

[54] MULTIPLE RECEIVER SCREEN TYPE PICTURE DISPLAYING DEVICE

[75] Inventors: Alain Cousin, La Garenne-Colombes; Henri Berard, Etampes, both of France

[73] Assignee: Compagnie Industrielle des Telecommunications Cit-Alcatel, Paris, France

[22] Filed: Mar. 5, 1975

[21] Appl. No.: 555,614

[30] Foreign Application Priority Data
Mar. 13, 1974 France .............................. 74.08535

[52] U.S. Cl. ...................... 340/324 AD; 340/172.5
[51] Int. Cl.² ........................................... G06F 3/14
[58] Field of Search ................ 340/324 A, 324 AD; 178/DIG. 22, 7.5 D, 6.8

[56] References Cited
UNITED STATES PATENTS

| | | | |
|---|---|---|---|
| 3,485,946 | 12/1969 | Jackson et al. | 340/324 AD |
| 3,539,999 | 11/1970 | Houldin et al. | 340/324 A |
| 3,555,520 | 1/1971 | Helbig et al. | 340/324 AD |
| 3,671,957 | 6/1972 | Kegelman et al. | 340/324 AD |
| 3,688,272 | 8/1972 | Baumgartner | 340/172.5 |
| 3,737,890 | 6/1973 | Salava | 340/324 AD |

*Primary Examiner*—David L. Trafton
*Attorney, Agent, or Firm*—Haseltine, Lake & Waters

[57] ABSTRACT

A device for displaying distinct pictures on $n$ receiver screens of the television type comprising $n+1$ picture maintaining memories which can be connected to the $n$ receivers through $n$ switches and a monitoring element ensuring the charging of the memory which has not been read during the reading of the $n$ memories.

2 Claims, 2 Drawing Figures

MULTIPLE RECEIVER SCREEN TYPE PICTURE DISPLAYING DEVICE

The present invention relates to devices for displaying pictures stored in coded form in a computer. It concerns, more particularly, devices for displaying pictures on cathode screens of receivers of the television type, enabling a frequent renewal of pictures and a rapid change observed as being effected in a single phase.

In these devices, it is necessary to renew the same picture presented on the screen a great number of times to obtain a picture maintaining effect without any flickering. This requirement has led to the combining, with each receiver, of a memory, called the maintaining memory, storing the data coming from the computer which is relative to the picture to be displayed, with a view to avoiding a continual discharge, at a very high rate, of data from the computer, which should then transmit a message only when it is necessary to modify the picture.

Moreover, in the case of pictures to be displayed having a great definition power, imparted by the number of elementary points constituting the picture on the cathode screen and in which each elementary point is defined by a word having several bits, the displaying speed for a picture is limited by the time for the output of binary data from the computer. To avoid such a limitation with respect to the displaying speed, it is possible to combine, with each receiver, an extra memory identical to the above-mentioned maintaining memory, enabling the storing of the following "logic" picture to be made available during the displaying of the "logic" picture stored in the first memory. In that solution, the two memories have a reversible operation: one operates in the reading state, while the other is charged, so that at each change of picture, the new logic picture is directly available.

In display devices having several display screens for distinct pictures, that solution leads to expensive equipment. Moreover, when each elementary point of a picture is defined by a great number of binary elements which are to be applied to the control circuits of the cathode tube of the receiver in a very short time, the doubling of the maintaining memories operating, one in the charging state and the other in the writing state, would lead to the forming of a very high number of wiring systems between the various circuits.

The aim of the present invention is precisely to obviate the above disadvantages.

It has as its object a device for displaying pictures on the screens of n receivers of the television type from binary data coming from a computer and stored temporarily in the memories during the displaying of those pictures for the maintaining of the pictures on the screens, characterized in that the said memories are n + 1 in number and are each connected to the said computer for their charging and that the said device comprises n switches ensuring the connection of any one of the n + 1 memories on one of the said receivers and a dynamic memory monitoring element ensuring the setting in the charge state of one of the memories during reading and the connecting of the n other memories respectively to the n receivers for the displaying of n different memories.

Other characteristics and the advantages of the present invention will become apparent from the description of an embodiment shown in the accompanying drawing, in which:

FIG. 1 shows the device according to the invention in the case where it comprises three receivers of the television type, shown diagrammatically at 1, 2 and 3.

Figure 1:
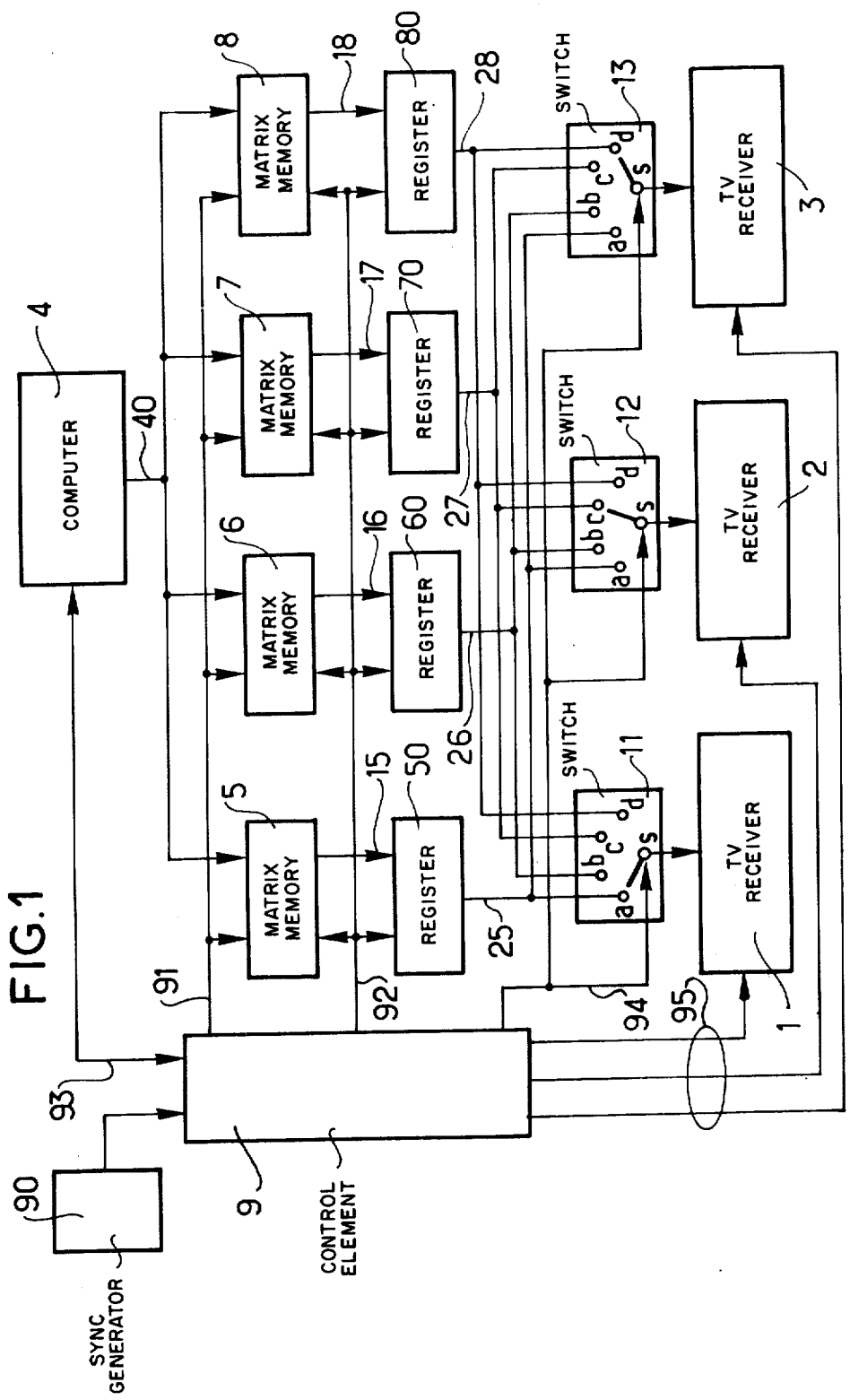
FIG. 1 is a block diagram of the device according to the invention.

The data relating to the pictures to be diplayed is generated by a computer 4 in response to data which it receives to constitute binary words having several binary elements, for example 8 bits, corresponding to each elementary point of the cathode screen. The number of binary words constituting a logic picture generated in the computer is given as a function of the definition of the picture on the receiving screen and therefore corresponds to the number of elementary points which the picture may comprise on the whole screen, for example, a matrix of 512 points by 512 points.

The device comprises, for the three receivers 1, 2 and 3, four matrix memories 5, 6, 7.and 8, identical to one another, called maintaining memories, each intended for receiving, from the computer 4 to which they are connected by the line 40, the binary words corresponding to a picture to be displayed and for maintaining these binary words during the display of the corresponding picture for the maintaining of the latter on the screen. A set of registers shown by a single block referenced 50, 60, 70 or 80 respectively, is connected with each of the memories 5 to 8. Each block receives binary data from the memories through the lines 15, 16, 17, 18 and is intended to enable rapid display of the pictures, as will be explained with reference to FIG. 2.

Three switches 11, 12 and 13, each having four inputs $a$, $b$, $c$ and $d$ and an output $s$, ensure the connection of three of the four memories 5 to 8, combinedwith their registers 50, 60, 70 and 80, with the three receivers 1, 2 and 3. The switches 11, 12 and 13 have their inputs a connected to the output 25 of the set of registers 50, their inputs b connected to the output 26 of the set of registers 60, their inputs c connected to the output 27 of the set of registers 70 and their outputs d connected to the output 28 of the set of registers 80. The outputs s of the switches are connected respectively to the receivers 1, 2 and 3.

The device comprises, moreover, a control element 9 ensuring the dynamic monitoring of the memories 5 to 8 and of the registers 50, 60, 70 and 80 combined therewith. That control element 9 ensures the setting in the reading state of three previously charged memories and the charging of the fourth memory from the computer.

A synchronization generator 90 is connected to the element 9 to fulfill these various functions in synchronism. In FIG. 1, the line 91 shows diagrammatically the charge state control of the memories 5 to 8, only one of the memories being charged at a time; the line 92 shows diagrammatically the unit reading state control of the memories 5 to 8, three of the memories being read at a time. The beginnings of reading are, in practice, shifted in relation to one another: in this way, the memory which has just been charged takes the place of the first of the memories in the reading state at the time of the end of the reading cycle for that picture, that is, when there is a picture charge order sent out at 93 by the computer to the control element 9. The control in the reading state of the memories 5 to 8 ensures simultaneously the setting to the charge state of the corresponding registers 50, 60, 70 and 80. The control element 9 ensures also, through its control line 94, the setting of each of the switches 11 to 13 to one of their positions a, b, c and d for one of the memories in the reading state to discharge through the combined registers respectively into the three receivers 1 to 3, the three switches are therefore simultaneously on the three different input positions. In FIG. 1, as diagrammatically shown, the memories 5, 7 and 8 are read, the memory 6 is therefore charged with a view to preparing the display of the following picture.

The control element 9 supplies, moreover, on its connection lines 95 with the receivers 1 to 3, signals for synchronization between the reading of the memories 5 to 8 through the sets of registers 50, 60, 70 and 80 and the scanning of the screens of the receivers 1 to 3.

Although the control element 9 has not been described in detail, the setting forth of its essential functions enables one skilled in the art to manufacture it easily by means of circuits for memorizing the state of the memories 5 to 8 and of logic gates controlled by the computer 4 as a function of the contents of the circuits for memorizing the states of the memories.

Figure 2:
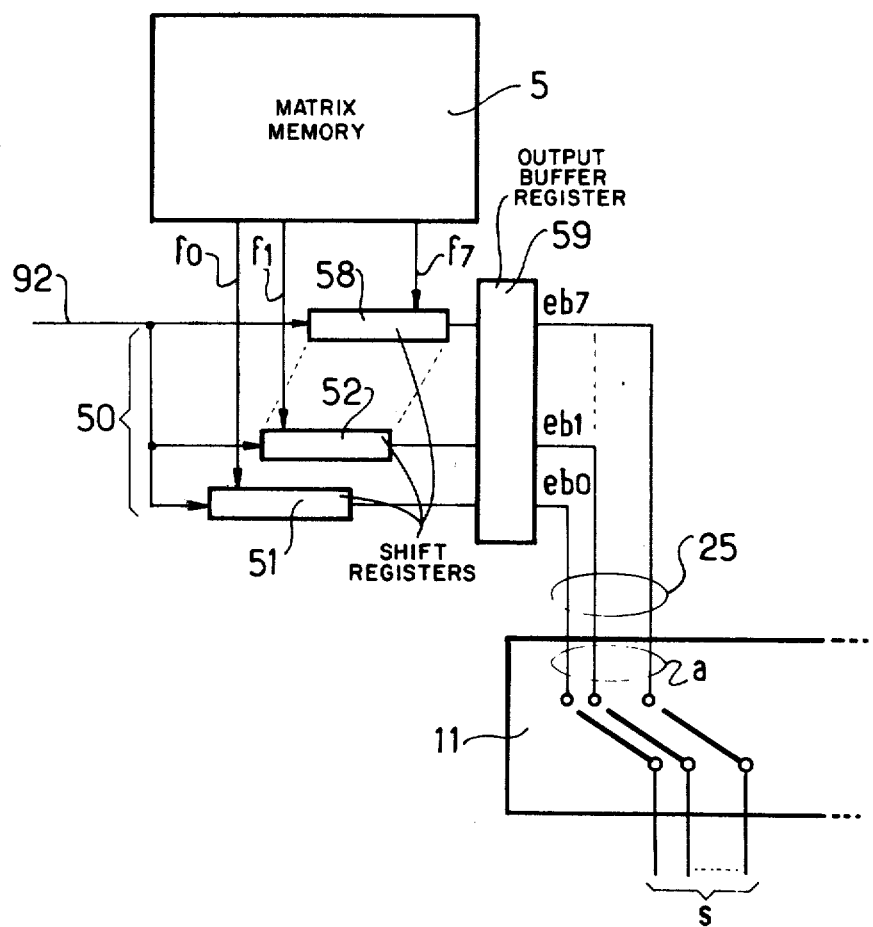
FIG. 2 shows in greater detail one of the blocks in FIG. 1.

FIG. 2 shows one of the sets of registers 50, 60, 70 and 80, identical to one another, for example the set 50 connected up to the memory 5. That set 50 is intended for ensuring, from the binary elements stored in the memory 5, a sufficiently rapid transfer of the memorized data to enable a virtually instantaneous display of a complete picture. Each set 50 is intended for extracting from the memory 5 simultaneously several binary words (to great advantage sixteen), each having eight bits, in a time in the order of 1.6µs, that time being compatible with the memory access time.

The set of registers 50 comprises eight shift registers 51 to 58 each having a capacity of 16 binary elements and an output buffer register 59 having a capacity of eight binary elements. The shift registers 51 to 58 are connected up to a hundred and twenty eight outputs of the memory 5 to be charged simultaneously, the bits of the same order of each binary word (each having eight bits) being stored in a same shift register. In FIG. 2, the connection lines $f0, f1 \ldots f7$ between the memory 5 and the registers 51 to 58 each have sixteen wires so that sixteen words may be stored simultaneously, in a very short time limited by the transfer characteristics of the memory 5. The buffer register 59 is connected to the shift registers 51 to 58, to enable the reconstitution of each binary word and the charge according to the registers 51 to 58 by 16 new words at the time of the reading of the last word previously stored. The buffer register 59 sends out the eight binary elements $eb$ 0 to $eb7$ of each word simultaneously on its outputs 25 and applies them to the multiple input $a$ of the switch 11 as diagrammatically shown in FIG. 2.

The control pulse 92 coming from the control element 9 is applied to the shift registers 51 to 58 to effect the advance by one order of their contents at each clock instant and the successive transfer of the 16 words which they contain to the buffer register 59. That control pulse 92 determines the rhythm of the transfers from the memory 5 towards the shift registers 51 to 58; in FIGS. 1 and 2, the two transfer control pulses, on the one hand from the memories, for example 5, towards the registers 51 to 58 and on the other hand, from the registers 51 to 58 towards the buffer register 59, have been shown by the same connection line 92 of these elements with the element 9, in practice, the transfer of data between each memory and the registers connected therewith is effected every sixteen clock shift instants applied to the registers. The blocks 60, 70 and 80 are identical to the assembly 50 previously described. They ensure also the extracting of the binary elements from the memeories 6, 7 and 8, when these latter will be set in the reading state, by words having eight binary elements.

Each of the switches 11, 12 and 13 therefore comprises four groups of eight inputs and one group of eight outputs for the transfer of binary data drom the memories to the receivers.

This arrangement of registers 50, 60, 70 and 80 at the output of the memories enables a rapid transfer from the binary elements towards the receivers per binary word. Moreover, it avoids a large amount of wiring which would be made necessary at the output of each of the memories, when there are no such groups of registers, for the rapid transfer of the binary elements from the emmemories to the receivers through the switches.

For a better understanding of the advantages of the device according to the invention, it will be observed that, for ensuring the writing, on three cathode screens, it comprises only four maintaining memories 5 to 8, connected with four sets of transfer registers 50, 60, 70 and 80 which may be connected up to the three receivers through three switches 11 to 13 each having four groups of inputs to ensure the transfer of the data per complete binary word. As for the transfer time, this device enables, at the output of the memories, the simultaneous extraction of a sequence of binary words, 16 in the example described, in a time in the order of 1.6µs and a transfer from the buffer registers towards the receiver every 0.1µs, of the binary data being, of course, read in the memories and made available on their outputs during the word by word transfer of data from the buffer registers to the receivers. If it is considered that each scanning line comprises 512 elementary points or binary words, the complete scanning of a line in the receiver will require substantially 51.2µs, it being unable to reach such a scanning speed if the transfer of the binary data from the memories to the receivers is effected directly bit by bit (The output performances of the memories would then be eight bits every 0.1µs; this not being possible). Taking into account the returns of the electronic beam between each scanning line, a complete picture will be displayed in twice 20 ms, to which is added the return time of the electronic beam at the beginning of the frame and between scanning half-frames having intertwined lines.

It will therefore be noticed that a change in picture displayed will be effected in a time in the order of 60 ms and will be observed as being effected instantaneously, it being impossible for the eye to notice that progressive change actually effected.

The present invention has been described with reference to an embodiment chosen by way of example, in the case where three receiving screens ensure the display of the pictures each defined by a matrix of 512 elementary points each coded by eight bits.

It is quite evident that details may be modified therein without going beyond the scope of the invention; more particularly, the number of screens, the definition of the pictures and the number of bits per elementary point may be different. In a general way, it will comprise a number of memories greater by one unit than the number of receivers, shift registers equal in number to the number of bits per binary word and having a capacity corresponding to a dividing of each picture line into segments having a same number of elementary points.

We claim:

1. Device for displaying pictures on the screens of $n$ receivers of the television type from binary data coming from a computer and stored temporarily in memories during the displaying of those pictures for the maintaining of the pictures on the screens, wherein said memories are $n + 1$ in number and are each connected to the said computer for their charging, said device comprising n switches ensuring the connection of any one of the $n + 1$ memories on one of the said receivers and a dynamic memory monitoring element ensuring the setting in the charge state of one of the memories during reading and the connecting of the $n$ other memories respectively to the n receivers for the displaying of $n$ different memories.

2. Device according to claim 1, which further comprises $n + 1$ sets of registers for the transfer of data connected respectively with the memories and interposed between the memories and the switches, each set being constituted on the one hand, by shift registers, equal in number to the number of binary data elements forming a binary word and defining each elementary picture point, connected to the corresponding memory to be charged simultaneously from the latter, receiving, respectively, the binary elements of the same order from several binary words corresponding to successive elementary points of the picture and, on the other hand, by a buffer output register connected to the said shift registers to send out successively the said binary words which are stored therein for the transfer of data to the receiver on which it is switched.

* * * * *